United States Patent
Chen et al.

(10) Patent No.: US 12,212,223 B2
(45) Date of Patent: Jan. 28, 2025

(54) CHARGING CIRCUIT

(71) Applicant: Silergy Semiconductor Technology (Hangzhou) LTD, Zhejiang (CN)

(72) Inventors: Siyuan Chen, Hangzhou (CN); Sihua Wen, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 159 days.

(21) Appl. No.: 17/986,087

(22) Filed: Nov. 14, 2022

(65) Prior Publication Data

US 2023/0170784 A1 Jun. 1, 2023

(30) Foreign Application Priority Data

Nov. 29, 2021 (CN) .......................... 202111435259.5

(51) Int. Cl.
*H02M 1/00* (2007.01)
*H02J 7/00* (2006.01)
*H02M 3/158* (2006.01)
*H02M 7/483* (2007.01)

(52) U.S. Cl.
CPC ....... *H02M 1/0095* (2021.05); *H02J 7/00714* (2020.01); *H02M 3/1582* (2013.01); *H02M 7/4837* (2021.05)

(58) Field of Classification Search
CPC ............. H02M 1/0095; H02M 3/1582; H02M 7/4837; H02M 3/07
See application file for complete search history.

(56) References Cited

U.S. PATENT DOCUMENTS

| | | |
|---|---|---|
| 6,005,780 A | 12/1999 | Hua |
| 6,580,258 B2 | 6/2003 | Wilcox et al. |
| 9,325,254 B2 | 4/2016 | Deng et al. |
| 9,331,588 B2 | 5/2016 | Chen |
| 9,488,680 B2 | 11/2016 | Xu |
| 2014/0078789 A1 | 3/2014 | Li et al. |
| 2014/0239934 A1 | 8/2014 | Zhang |
| 2015/0160270 A1 | 6/2015 | Shi et al. |
| 2015/0280578 A1 | 10/2015 | Huang et al. |
| 2017/0187214 A1* | 6/2017 | Xu ............................ H02J 7/00 |
| 2021/0203179 A1* | 7/2021 | Gambetta ........... H02M 3/1582 |

OTHER PUBLICATIONS

Zhang Yuqing et al: "multilevel non-inverting buck-boos converter with low-frequency ripple shaping based controller ... " 2018 IEEE 19th workshop on control and modeling for power electronics (COMPEL), IEEE, Jun. 25, 2018 (Jun. 25, 2018), p. 1-7,XP033402399 (Year: 2018).*

* cited by examiner

*Primary Examiner* — Jue Zhang
*Assistant Examiner* — Afework S Demisse

(57) ABSTRACT

A charging circuit can include: a first module having a plurality of power transistors, and being coupled between a first port and a reference ground; a second module having a plurality of power transistors, and being coupled between a second port and the reference ground; at least one inductor coupled between the first module and the second module; and where at least one of the first module and the second module forms a multi-level converter with the at least one inductor.

20 Claims, 14 Drawing Sheets

CHARGING CIRCUIT

RELATED APPLICATIONS

This application claims the benefit of Chinese Patent Application No. 202111435259.5, filed on Nov. 29, 2021, which is incorporated herein by reference in its entirety.

FIELD OF THE INVENTION

The present invention generally relates to the field of power electronics, and more particularly to charging circuitry.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

With processor performance improvements in portable devices, power consumption, and battery capacity also continue to increase. The previous 100 W USB PD 20V/5 A power supply may no longer satisfy the demand. Due to limitations of USB cables and interfaces, current can be difficult to increase in these cases. Hence, the latest USB PD 3.1 may need to increase the transmission power by increasing the voltage. As a result, the input voltage of a traditional buck-boost charger can significantly increase, thus resulting in a significant drop in efficiency, particularly in the high input voltage scenarios of USB PD 3.1 (e.g., 28V, 36V, and 48V). Based on the above, there is an urgent need to resolve this problem by providing a high efficiency charger.

Figure 1:
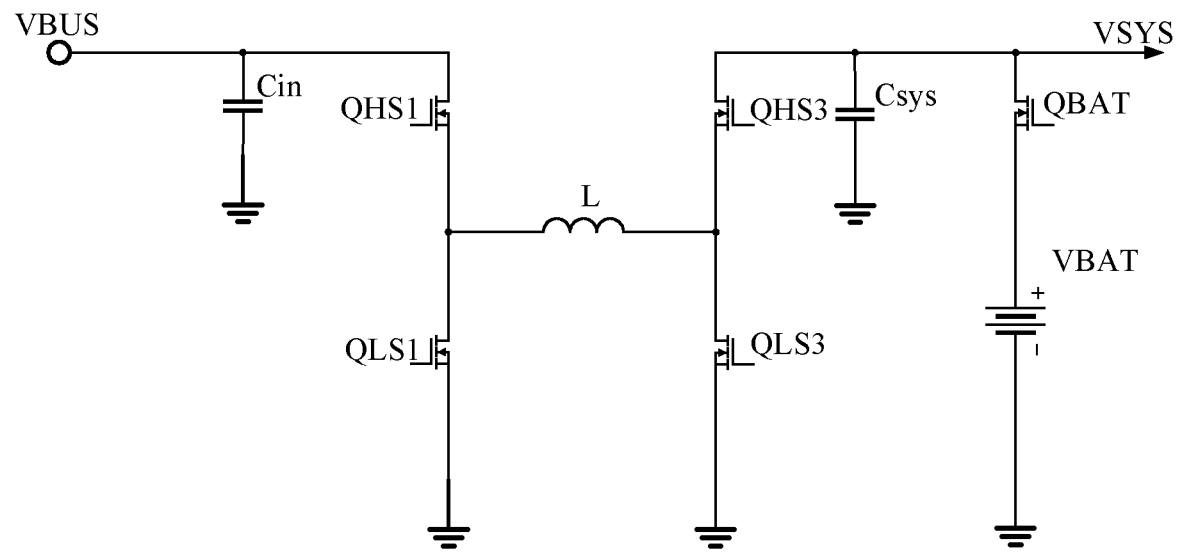
FIG. 1 is a schematic block diagram of an example buck-boost charging circuit.

Referring now to FIG. 1, shown is a schematic block diagram of one example buck-boost charging circuit. In this particular example, the charging circuit can allow the input voltage to be lower than, equal to, or higher than the output (system/battery) voltage. This approach may have the highest efficiency when the input voltage and the output voltage are close. If the input voltage is higher than the system voltage, the charging circuit can operate in the buck mode. However, its efficiency can significantly drop when the input voltage is much higher than the output voltage. A power transistor QBAT can be used for path management, and it may operate in a linear region, a saturation region, or a cutoff region according to the charging state, in order to satisfy charging current requirements.

In particular embodiments, a charging circuit can include a first module/circuit, a second module/circuit, and an inductor. The first module can include a plurality of power transistors that can connect between a first port and a reference ground. The second module can include a plurality of power transistors that can connect between a second port and the reference ground. The inductor can connect between the first module and the second module. The first module and/or the second module respectively may form multi-level converters with the inductor. In addition, the charging circuit can operate in a buck mode, a boost mode, or a buck-boost mode, according to a magnitude relationship between an input voltage and an output voltage.

Figure 2:
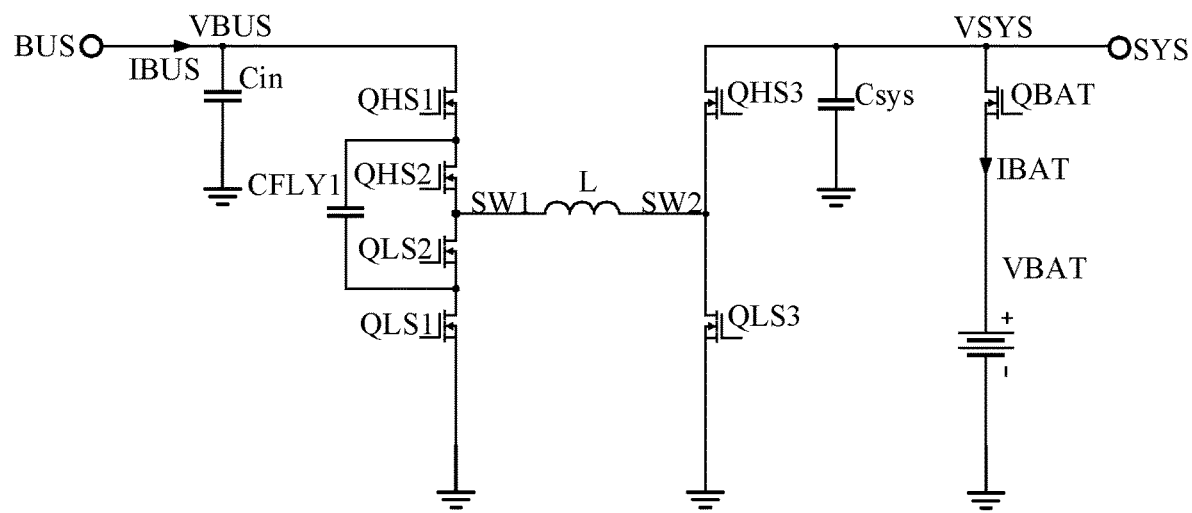
FIG. 2 is a schematic block diagram of a first example charging circuit, in accordance with embodiments of the present invention.

Referring now to FIG. 2, shown is a schematic block diagram of a first example charging circuit, in accordance with embodiments of the present invention. This example charging circuit can include a first module, a second module, and inductor L. The first module and inductor L may form a three-level buck converter. The second module and inductor L may form a boost converter (e.g., port BUS can be taken as an input port and port SYS as an output port). For example, the first module can include power transistors QHS1, QHS2, QLS2, and QLS1 that can connect in series between port BUS and a reference ground. The first module can also include flying capacitor CFLY1 that can connect between a common node of power transistors QHS1 and QHS2 and a common node of power transistors QLS2 and QLS1. In addition, the first module can also include capacitor Cin that can connect between port BUS and the reference ground.

The second module can include power transistors QHS3 and QLS3 that can connect in series between port SYS and the reference ground, capacitor Csys that can connect between port SYS and the reference ground, and battery BAT and power transistor QBAT that can connect in series between port SYS and the reference ground. Power transistor QBAT can be controlled to operate in a complete conduction region, a linear region, or a cutoff region, according to a charging state of battery BAT to satisfy the requirements of battery charging. Inductor L can connect between a middle node of the first module (e.g., a common node of power transistors QHS2 and QLS2), and a middle node of the second module (e.g., a common node of power transistors QHS3 and QLS3).

In the examples herein, the first module having three levels is shown for illustration. Those skilled in the art will recognize that the first module can have more levels, such that the first module and the inductor may form a multi-level converter. In addition, in the following description, port BUS being the input port and port SYS being the output port is taken as an example for illustration. Those skilled in the art will recognize that other arrangements, such as when port BUS is the output port and port SYS is the input port, may also be utilized in certain embodiments.

In particular embodiments, the charging circuit may have three operating modes. When input voltage VBUS of port BUS is significantly higher than output voltage VSYS of port SYS (e.g., when a ratio of input voltage VBUS to output voltage VSYS is higher than a first threshold value), the charging circuit can be in a three-level buck mode. When input voltage VBUS is significantly lower than output voltage VSYS (e.g., when the ratio of input voltage VBUS to output voltage VSYS is lower than a second threshold value), the charging circuit can be in a boost mode. When input voltage VBUS and output voltage VSYS are relatively close (e.g., when the ratio of input voltage VBUS to output voltage VSYS is between the first and second threshold values), the charging circuit can enter a buck-boost mode, in order to realize smooth switching between a buck mode and the boost mode.

Figure 3:
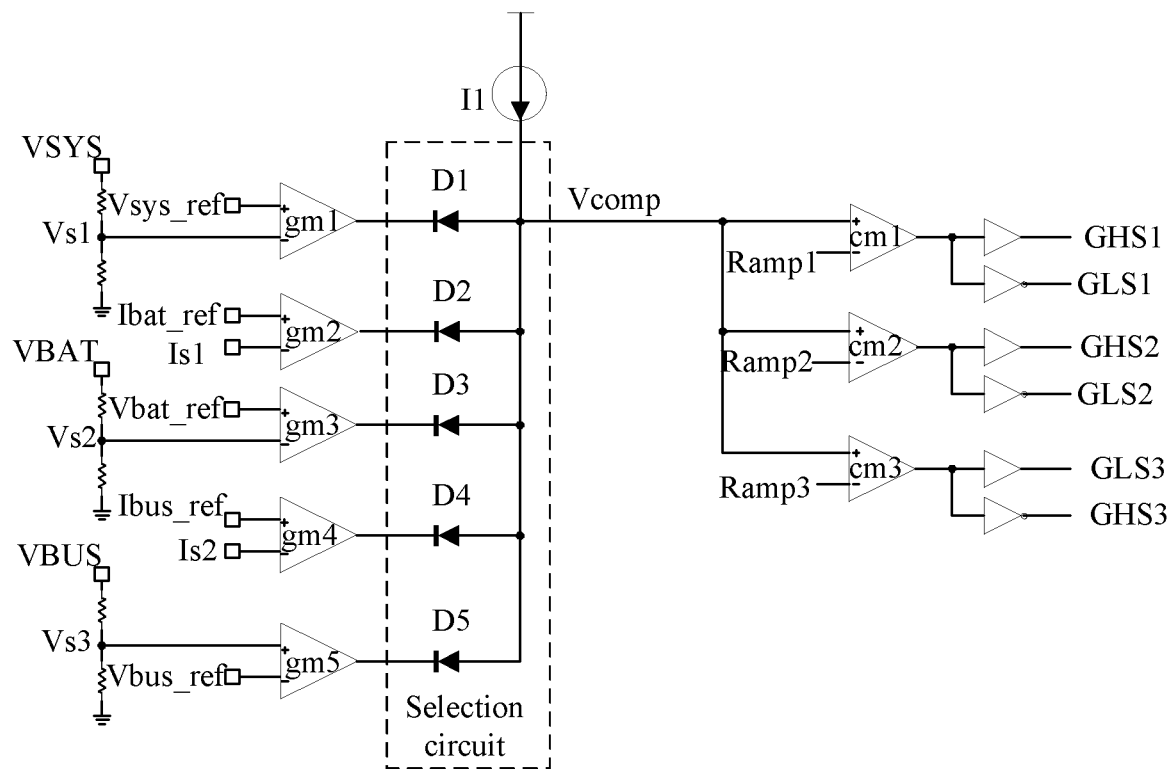
FIG. 3 is a logic block diagram of an example control circuit of the charging circuit, in accordance with embodiments of the present invention.

Referring now to FIG. 3, shown is a logic block diagram of an example control circuit of the charging circuit, in accordance with embodiments of the present invention. This particular example control circuit can select control parameters depending on particular needs, in order to meet predetermined requirements. In particular embodiments, the control circuit may receive a plurality of control parameters and a plurality of reference signals respectively corresponding to the plurality of control parameters, in order to control one of the control parameters to be equal to its corresponding reference signal, and to control the other control parameters except for input voltage VBUS to be not greater than their corresponding reference signals.

For example, the control circuit can include error amplifiers gm1, gm2, gm3, gm4, and gm5. Error amplifier gm1 may receive voltage sampling signal Vs1 representing output voltage VSYS and voltage reference signal Vsys_ref, and may generate a first compensation signal based on an error between the two. Error amplifier gm2 may receive current sampling signal Is1 representing a charging current IBAT and current reference signal Ibat_ref, and may generate a second compensation signal based on an error between the two. Error amplifier gm3 may receive voltage sampling signal Vs2 representing battery voltage VBAT and voltage reference signal Vbat_ref, and may generate a third compensation signal based on an error between the two. Error amplifier gm4 may receive current sampling signal Is2 representing input current IBUS and current reference signal Ibus_ref, and may generate a fourth compensation signal based on an error between the two. Error amplifier gm5 may receive voltage sampling signal Vs3 representing input voltage VBUS and voltage reference signal Vbus_ref, and may generate a fifth compensation signal based on an error between the two. The control circuit can also include a selection circuit that may receive a signal output by each of the error amplifiers, and can select a smallest one among them to output as compensation signal Vcomp.

In particular embodiments, the selection circuit can include a plurality of diodes, where cathodes of the diodes can respectively connect to output terminals of the error amplifiers, and anodes of all the diodes can connect together to select and output the smallest one of the signals output by all the error amplifiers as compensation signal Vcomp. For example, error amplifier gm1 can connect to a cathode of diode D1, error amplifier gm2 can connect to a cathode of diode D2, error amplifier gm3 can connect to a cathode of diode D3, error amplifier gm4 can connect to a cathode of diode D4, and error amplifier gm5 can connect to a cathode of a diode D5. Anodes of diodes D1-D5 can connect together. The control circuit can also include current source I1 that can connect between a power supply and the anode of diode D1, in order to adjust compensation signal Vcomp. Those skilled in the art will recognize that the particular circuit for selecting the smallest one of the signals output by the error amplifiers as the compensation signal can be any suitable circuit capable of realizing this function in certain embodiments.

In particular embodiments, for fast charging scenarios, when voltage sampling signal Vs2 representing battery voltage VBAT has not reached voltage reference signal Vbat_ref, the control circuit can generate compensation signal Vcomp based on the error between current sampling signal Is1 representing charging current IBAT and current reference signal Ibat_ref, in order to control a switching state of each of power transistors. As a result, st current sampling signal IBAT can be adjusted to be equal to current reference signal Ibat_ref; that is, the charging current can be maintained at an expected current value, in order to perform constant current charging. In addition, the charging circuit may satisfy the following conditions: voltage sampling signal Vs1≤voltage reference signal Vsys_ref, current sampling signal Is2≤current reference signal Ibus_ref, voltage sampling signal Vs2 representing battery voltage VBAT≤voltage reference signal Vbat_ref, and voltage sampling signal Vs3 representing input voltage VBUS ≥voltage reference signal Vbus_ref.

As battery voltage VBAT increases, voltage sampling signal Vs2 can reach voltage reference signal Vbat_ref. At this time, compensation signal Vcomp may be determined by the error between voltage sampling signal Vs2 and voltage reference signal Vbat_ref, such that voltage sampling signal Vs2 is maintained at voltage reference signal Vbat_ref. That is, battery voltage VBAT can be equal to an expected voltage value, and the charging circuit may be switched to constant voltage charging. Here, the charging circuit can satisfy the following conditions: current sampling signal Is1 representing charging current IBAT≤current reference signal Ibat_ref, voltage sampling signal Vs1 representing output voltage VSYS≤voltage reference signal Vsys_ref, current sampling signal Is2 representing input current IBUS≤current reference signal Ibus_ref, and voltage sampling signal Vs3 representing input voltage VBUS≥voltage reference signal Vbus_ref.

Among the above several control parameters, input voltage VBUS, battery voltage VBAT, output voltage VSYS, input current IBUS, and charging current IBAT, when one of the control parameters acts to determine a value of compensation signal Vcomp, this control parameter can correspondingly be maintained at a reference signal, and the other control parameters except for input voltage VBUS mail not be greater than reference signals correspondingly. Input voltage VBUS may not be smaller than a reference signal correspondingly. If the above conditions are not met, the charging circuit may stop operating.

In addition, the control circuit can compare compensation signal Vcomp with against signals Ramp1, Ramp2, and Ramp3, respectively, in order to generate drive signals for the power transistors. For example, the control circuit can also include comparators cm1, cm2, and cm3. Comparator cm1 can compare compensation signal Vcomp against ramp signal Ramp1, in order to generate a drive signal GHS1 for controlling power transistor QHS1 and drive signal GLS1 for controlling power transistor QLS1, whereby drive signals GHS1 and GLS1 are complementary to each other. When compensation signal Vcomp is greater than ramp signal Ramp1, drive signal GHS1 can be active (e.g., at a high level) and drive signal GLS1 may be inactive (e.g., at a low level). Comparator cm2 can compare compensation signal Vcomp against ramp signal Ramp2, in order to generate a drive signal GHS2 for controlling power transistor QHS2 and drive signal GLS2 for controlling power transistor QLS2, whereby drive signals GHS2 and GLS2 are complementary to each other.

When compensation signal Vcomp is greater than ramp signal Ramp2, drive signal GHS2 can be active (e.g., at a high level) and drive signal GLS2 may be inactive (e.g., at a low level). Comparator cm3 can compare compensation signal Vcomp against ramp signal Ramp3, in order to generate a drive signal GHS3 for controlling power transistor QHS3 and drive signal GLS3 for controlling power transistor QLS3, whereby drive signals GHS3 and GLS3 are complementary to each other. When compensation signal Vcomp is greater than ramp signal Ramp3, drive signal GLS3 can be active (e.g., at a high level) and drive signal GHS3 may be inactive (e.g., at a low level).

Figure 4:
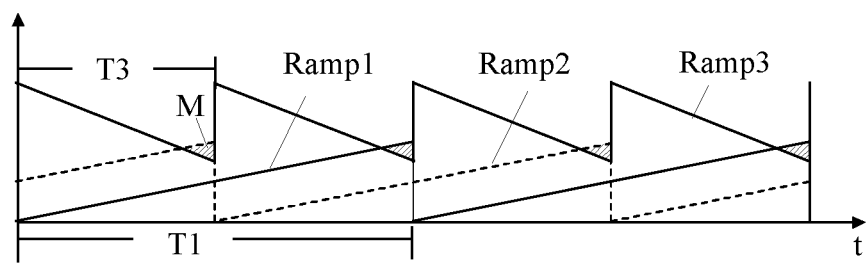
FIG. 4 is a waveform diagram of example ramp signals in the control circuit, in accordance with embodiments of the present invention.

Referring now to FIG. 4, shown is a waveform diagram of ramp signals in the control circuit, in accordance with embodiments of the present invention. In this particular example, a period of ramp signal Ramp1 and a period of ramp signal Ramp2 can be the same (e.g., T1). Also, amplitudes of ramp signals Ramp1 and Ramp2 can be the same, and change trends of the two also the same. For example, both of them are ramps with an increasing trend, and there is a phase difference of 180° between them. A period T3 of ramp signal Ramp3 can be half of period T1 of ramp signal Ramp1, and its change trend may be opposite to the change trend of ramp signal Ramp1, which is a ramp with a decreasing trend. In addition, a minimum value of ramp signal Ramp3 can be slightly lower than a maximum value of ramp signal Ramp1 or ramp signal Ramp2, so ramp signal Ramp3 can intersect ramp signal Ramp1 or ramp signal Ramp2 in every period T3, as shown by hatched portions M.

In particular embodiments, since an inductor current has a frequency multiplication effect in the three-level buck mode, a switching frequency in the boost mode can be set to be twice that in the buck mode to achieve a better effect. However, in other applications, those skilled in the art will recognize that the switching frequency in the boost mode can be set to be the same as the switching frequency in the buck mode; that is, period T3 of ramp signal Ramp3 is the same as period T1, or may set it to other situations.

Figure 5:
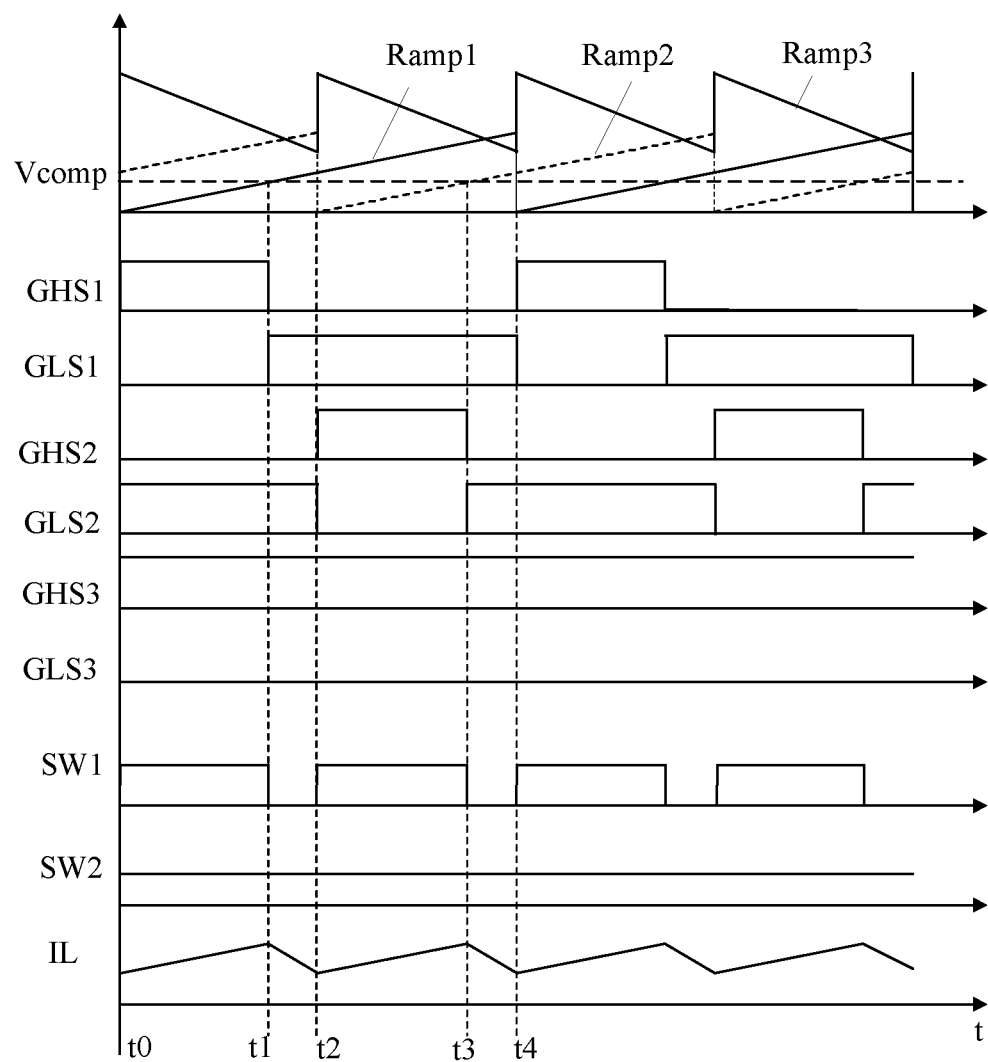
FIG. 5 is a waveform diagram of example operation of a charging circuit in a buck mode, in accordance with embodiments of the present invention.
Figure 6:
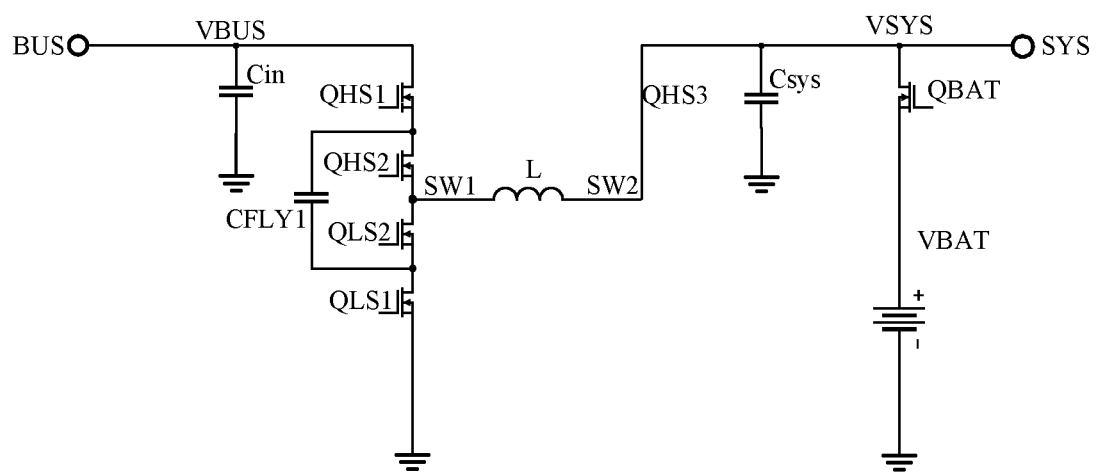
FIG. 6 is an equivalent schematic block diagram of a charging circuit in a buck mode, in accordance with embodiments of the present invention.

In the following description, three different operating modes of the charging circuit are described. Referring now to FIG. 5, shown is a waveform diagram of example operation of a charging circuit in a buck mode, in accordance with embodiments of the present invention. Referring now to FIG. 6, shown is an equivalent schematic block diagram of a charging circuit in a buck mode, in accordance with embodiments of the present invention. When input voltage VBUS is significantly higher than output voltage VSYS, the charging circuit can be in the three-level buck mode. The power transistors of the first module can be in a pulse-width modulation (PWM) switching state, and the power transistors of the second module may be kept normally on or off. The operating principle of the charging circuit in the buck mode is described below with reference to FIGS. 5 and 6.

As shown in FIG. 5, compensation signal Vcomp may be smaller than a lowest value of ramp signal Ramp3 in the buck mode, such that drive signal GHS3 can be at a high level and drive signal GLS3 at a low level. That is, power transistor QHS3 can be turned on and power transistor QLS3 turned off. At this time, the equivalent schematic block diagram of the charging circuit can be as shown in FIG. 6, the charging circuit is a three-level buck converter, and a potential of a node SW2 is equal to output voltage VSYS.

In the buck mode, power transistors QHS1 and QLS1 can be controlled under PWM switching operations, and the switching states of the two may be complementary to each other. Additionally, power transistors QHS2 and QLS2 can be controlled under the PWM switching operations, and the switching states of the two may be complementary to each other. A phase shift angle between drive signals GHS1 and GHS2 can be 180°. With additional reference to FIG. 5, when compensation signal Vcomp is greater than ramp signal Ramp1, drive signal GHS1 can be high and drive signal GLS1 may be low. When compensation signal Vcomp is smaller than ramp signal Ramp1, drive signal GLS1 can be high and drive signal GHS1 may be low. Similarly, when compensation signal Vcomp is greater than ramp signal Ramp2, drive signal GHS2 can be high and drive signal GLS2 may be low. When compensation signal Vcomp is smaller than ramp signal Ramp2, drive signal GLS2 can be high and drive signal GHS2 may be low.

With additional reference to FIGS. 5 and 6, during time period t0-t1, power transistors QHS1 and QLS2 may be turned on at the same time, and a conductive path can be: port BUS, QHS1, CFLY1, QLS2, L, QHS3, port SYS. Input voltage VBUS can charge flying capacitor CFLY1, and may provide energy to battery BAT and some other electrical load. At this time, a potential of node SW1 can be equal to a difference between input voltage VBUS and voltage VCFLY1 across flying capacitor CFLY1, and inductor current IL can rise. During time period t1-t2, power transistors QLS1 and QLS2 may be turned on at the same time, the potential of node SW1 can be zero, inductor current IL may freewheel through QLS1 and QLS2, inductor L can discharge energy to port SYS, and inductor current IL may decrease.

During time period t2-t3, power transistors QLS1 and QHS2 can be turned on at the same time, and flying capacitor CFLY1 can discharge energy to battery BAT and the electrical load. For example, the conductive path is: CFLY1, QHS2, L, QHS3, SYS, QLS1. At this time, the potential of node SW1 can be the voltage VCFLY1 across flying capacitor CFLY1, which is the same as that during time period t0-t1 because VCLFY1=1/2VBUS under normal circumstances. Also, inductor current IL can rise during time period t1-t2. During time period t3-t4, power transistors QLS1 and QLS2 may be turned on at the same time, the potential of node SW1 may be zero, inductor current IL can freewheel through QLS1 and QLS2, inductor L can discharge energy to port SYS, and inductor current IL may decrease. At this point, one operating cycle (e.g., t0-t4) ends. Here, the operating cycle refers to a cycle during which the circuit completes the switching of the operating states and begins to repeat in a next cycle.

For convenience of description, a dead time may be ignored. It should be understood that in particular applications, in order to avoid the direct connection of the two complementary power transistors, a dead time may generally be set. In addition, the above description only takes a duty ratio to be less than 0.5 as an example for illustration, while those skilled in the art will recognize that the duty ratio can be extended to be greater than 0.5, or less than 0.5 in other cases. Owing to the three-level structure, withstand voltages of power transistors QHS2, QLS1, and QLS2 may all be 1/2 VBUS, which can be reduced by half as compared with that in FIG. 1. The inductor current may have the frequency multiplication effect, and a voltage difference across two terminals of the inductor can be reduced. In this way, the required inductance can be reduced, and an overall efficiency improved.

Figure 7:
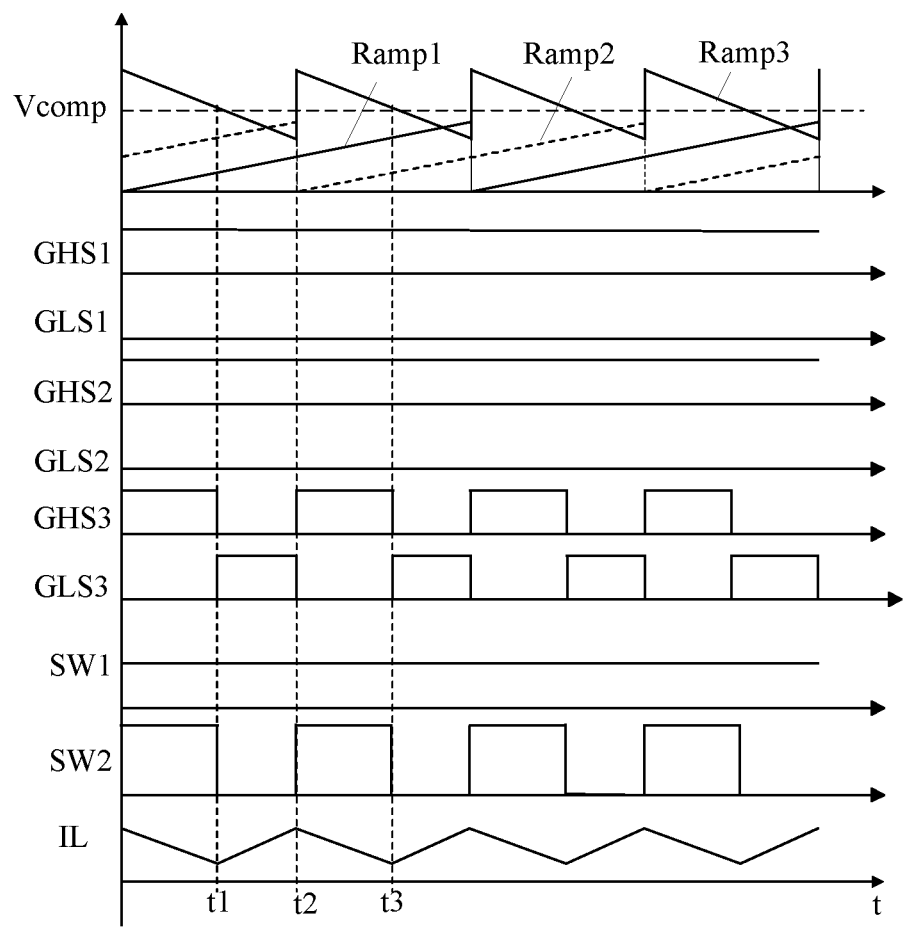
FIG. 7 is a waveform diagram of example operation of a charging circuit in a boost mode, in accordance with embodiments of the present invention.
Figure 8:
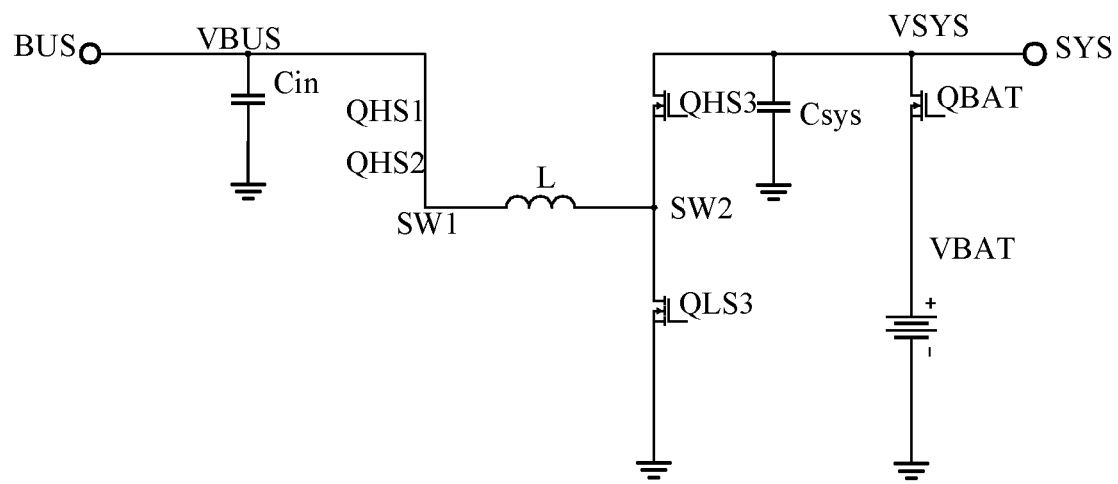
FIG. 8 is an equivalent schematic block diagram of a charging circuit in a boost mode, in accordance with embodiments of the present invention.

Referring now to FIG. 7, shown is a waveform diagram of example operation of a charging circuit in a boost mode, in accordance with embodiments of the present invention. Referring also to FIG. 8, shown is an equivalent schematic block diagram of a charging circuit in a boost mode, in accordance with embodiments of the present invention. When input voltage VBUS is significantly lower than output voltage VSYS, the charging circuit can be in the boost mode. The power transistors of the first module may be kept normally on or off, and the power transistors of the second module can be in the PWM switching state to be alternately turned on and off. The operating principle of the charging circuit in the boost mode is described below with reference to FIGS. 7 and 8.

As shown in FIG. 7, in the boost mode, compensation signal Vcomp can be higher than a highest value of ramp signals Ramp1 and Ramp2, so drive signals GHS1 and GHS2 can be at the high level and drive signals GLS1 and GLS2 at the low level. That is, power transistors QHS1 and QHS2 can be turned on and power transistors QLS1 and QLS2 turned off. The equivalent schematic block diagram of the charging circuit is shown in FIG. 8. Here, the potential of node SW1 can be equal to input voltage VBUS. In addition, compensation signal Vcomp intersects ramp signal Ramp3, such that power transistors QHS3 and QLS3 can be controlled under the PWM switching operations, and the switching states of the two are complementary to each other. For example, when compensation signal Vcomp is smaller than ramp signal Ramp3, drive signal GHS3 can be high and drive signal GLS3 low. When compensation signal Vcomp is greater than ramp signal Ramp3, drive signal GLS3 can be high and drive signal GHS3 low.

With additional reference to FIGS. 7 and 8, during time period t1-t2, power transistor QLS3 can be turned on, power transistor QHS3 may be turned off, and the conductive path can be: port BUS, QHS1, QHS2, L, QLS3 to the reference ground. At this time, node SW2 may be at the low level, so input voltage VBUS can store energy in inductor L at this stage, and inductor current IL may rise. During time period t2-t3, power transistor QHS3 can be turned on, power transistor QLS3 may be turned off, and the conductive path can be: port BUS, QHS1, QHS2, L, QHS3 to port SYS. At this time, the potential of node SW2 may be equal to output voltage VSYS. Inductor L can discharge energy to battery BAT and the electrical load, and inductor current IL may decrease. At this point, one operating cycle ends. An operating frequency in the boost mode can be twice that in the three-level buck mode. It should be understood that when it is a multi-level converter, the particular setting of the switching frequency in the boost mode depends on the number of levels.

Figure 9:
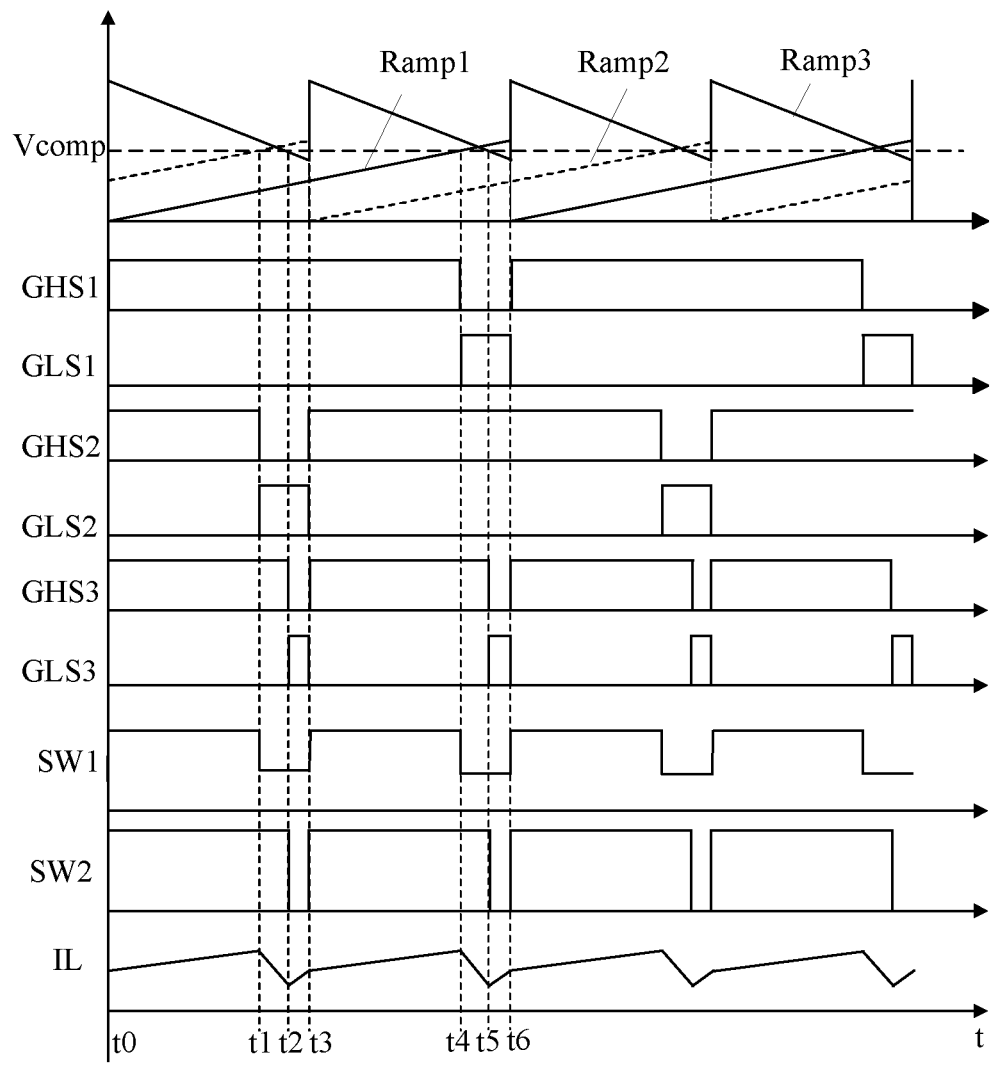
FIG. 9 is a waveform diagram of example operation of a charging circuit in a buck-boost mode, in accordance with embodiments of the present invention.

Referring now to FIG. 9, shown is a waveform diagram of example operation of a charging circuit in a buck-boost mode, in accordance with embodiments of the present invention. The working principle of the charging circuit in the buck-boost mode is described below with reference to FIGS. 2 and 9. When input voltage VBUS and output voltage VSYS are relatively close, the charging circuit can be in the buck-boost mode. Compensation signal Vcomp intersects all ramp signals Ramp1, Ramp2, and Ramp3, such that power transistors QHS1, QLS1, QHS2, QLS2, QHS3, and QLS3 can be controlled to operate in the PWM switching state. In the following, input voltage VBUS being slightly higher than output voltage VSYS is taken as an example for illustration.

With additional reference to FIGS. 2 and 9, during time period t0-t1, power transistors QHS1, QHS2, and QHS3 may be turned on, and the conductive path can be: port BUS, QHS1, QHS2, L, QHS3 to port SYS. The potential of node SW1 may be equal to input voltage VBUS, and the potential of node SW2 can be equal to output voltage VSYS. During this period, input voltage VBUS may provide energy to battery BAT and the electrical load, and inductor current IL may rise. During time period t1-t2, power transistors QHS1, QLS2, and GHS3 can be turned on, and the conductive path may be: port BUS, QHS1, CFLY1, QLS2, L, QHS3 to port SYS. The potential of node SW1 can be equal to VBUS-VCFLY1=0.5 VBUS and the potential of node SW2 may be equal to output voltage VSYS, such that input voltage VBUS charges flying capacitor CFLY1 and supplies power to the load together with inductor, and inductor current IL may decrease.

During time period t2-t3, power transistors QHS1, QLS2 and QLS3 can be turned on, and the conductive path may be: port BUS, QHS1, CFLY1, QLS2, L, QLS3 to the reference ground. At this time, the potential of node SW1 can be equal to VBUS-VCFLY1=0.5 VBUS, and the potential of node SW2 may be equal to zero. During this period, input voltage VBUS can charge flying capacitor CFLY1, and may store energy in inductor L at the same time, and thus inductor current IL may rise. During time period t3-t4, power transistors QHS1, QHS2, and QHS3 can be turned on, which is the same as the time period from t0 to t1. During time period t4-t5, power transistors QLS1, QHS2 and QHS3 may be turned on, and the conductive path can be: CFLY1, QHS2, L, QHS3, port SYS, QLS1, then return to CFLY1.

The potential of node SW1 may be equal to voltage VCLFY1 across flying capacitor CFLY1, and VCLFY1=0.5VBUS, and the potential of node SW2 can be equal to output voltage VSYS, such that flying capacitor CFLY1 and inductor L jointly discharge energy to battery BAT and the electrical load. Thus, inductor current IL can decrease. During time period t5-t6, power transistors QLS1, QHS2, and QLS3 can be turned on, and the conductive path may be: CFLY1, QHS2, L, QLS3, and QLS1, then return to CLFY1. The potential of node SW1 can be equal to voltage VCLFY1 across flying capacitor CFLY1, and VCLFY1=0.5VBUS, and the potential of node SW2 may be equal to zero. During this period, flying capacitor CFLY1 can discharge energy to inductor L to store energy, and inductor current IL may rise. At this point, one operating cycle ends.

It should be understood that since the efficiency in the buck-boost mode is lower than that in the boost mode or the buck mode under the same conditions, it is not intended that the charging circuit operates in the buck-boost mode for a long time. Therefore, the minimum value of ramp signal Ramp3 may only be slightly smaller than the maximum value of ramp signals Ramp1 and Ramp2 when designing parameters of the ramp signals. For example, if the maximum value of ramp signal Ramp1 is 1, the minimum value of Ramp3 can be set to 0.9, such that the charging circuit may have a smooth transition between the boost mode and the buck mode, which would be sufficient.

Figure 10:
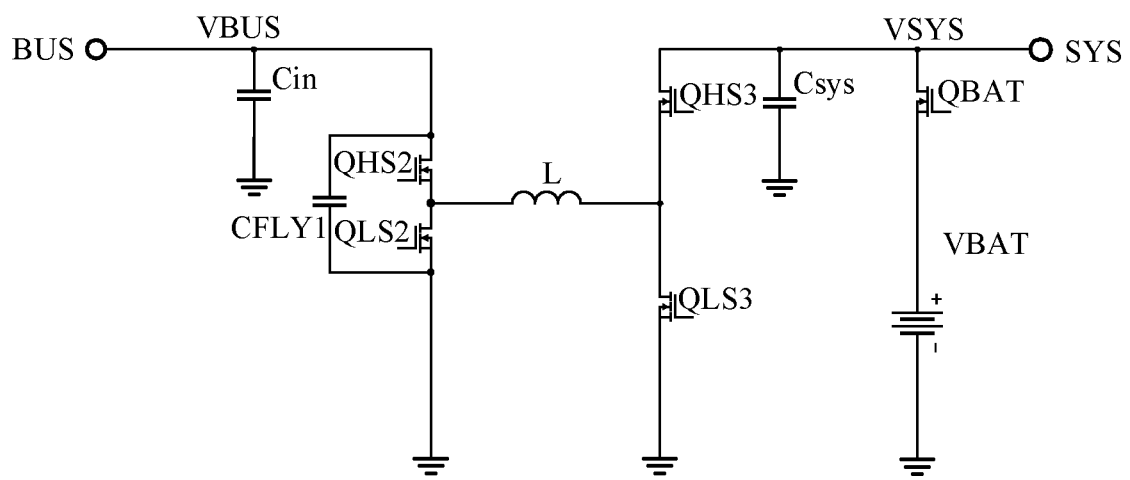
FIG. 10 is a schematic diagram of a first example equivalent circuit of a charging circuit in a buck-boost mode, in accordance with embodiments of the present invention.
Figure 11:
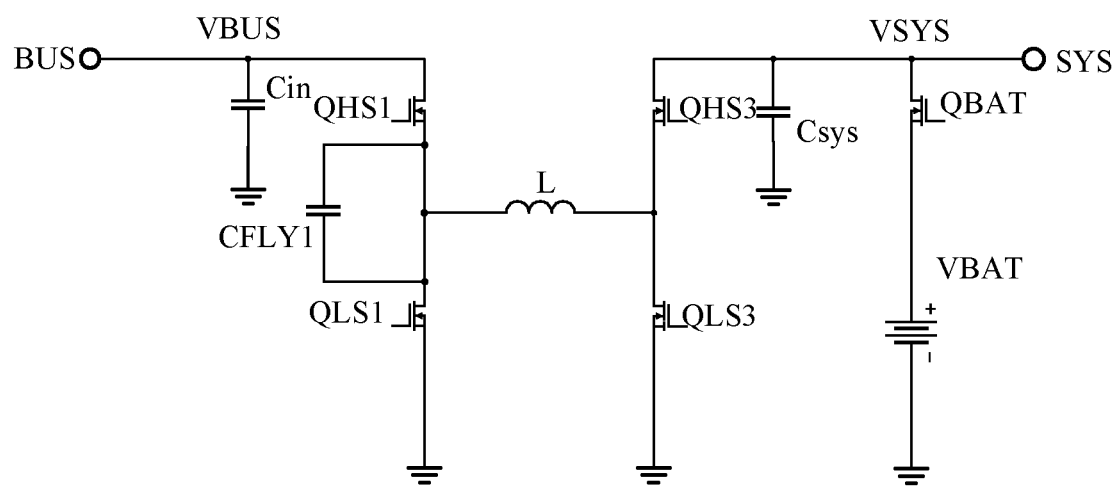
FIG. 11 is a schematic diagram of a second example equivalent circuit of a charging circuit in a buck-boost mode, in accordance with embodiments of the present invention.

Additionally, the buck-boost mode may also be implemented by using a method similar to a traditional four-switch buck-boost converter. In one implementation method, power transistors QHS1 and QLS1 may be kept in the turn-on state, and power transistors QHS2, QLS2, QHS3, and QLS3 can be in the PWM switching state. At this time, flying capacitor CFLY1 may be equivalent to being connected between input voltage VBUS and the reference ground, which may not affect the operation of the circuit, as show in FIG. 10. In another implementation method, power transistors QHS2 and QLS2 can be kept in the on state, and power transistors QHS1, QLS1, QHS3, and QLS3 may be in the PWM switching state. At this time, flying capacitor CFLY1 can be short-circuited, as shown in FIG. 11.

In this way, particular embodiments may provide an asymmetric multi-level buck-boost charging circuit, which can operate in the buck mode, the boost mode, and the buck-boost mode. The first module of the charging circuit adopts a multi-level structure, which can reduce switching loss, withstand voltage requirements of power components and inductance, and improve efficiency, as compared with a traditional buck-boost charging circuit. The power can be significantly increased to be adapted to the USB PD3.1 power adapter with a higher power without substantially increasing the system cost and the area required. In addition, from the perspective of power supply architecture, its system voltage range can be consistent with that of a traditional NVDC buck-boost charger, and may support a low-voltage input and is compatible with a traditional power supply architecture.

In the above description, the first port is the input port and the second port is the output port, for example. Those skilled in the art will recognize that when the first port is the output port and the second port is the input port, the charging circuit according to certain embodiments can similarly operate in the buck mode, the boost mode, and the buck-boost mode. For example, in a reverse buck mode, power transistors QHS1 and QHS2 can be in the on state, power transistors QLS1 and QLS2 may be in an off state, and power transistors QHS3 and QLS3 can operate in the PWM switching state. The charging circuit may be equivalent to a buck converter with the second port being the input port and the first port being the output port, thus realizing the step-down operation. In another example, power transistor QHS3 may be in the on state, power transistor QLS3 can be in the off state, and the other power transistors QHS1, QHS2, QLS1, and QLS2 may operate in the PWM switching state. The charging circuit can be equivalent to a three-level boost converter, thus realizing the step-up operation.

Figure 12:
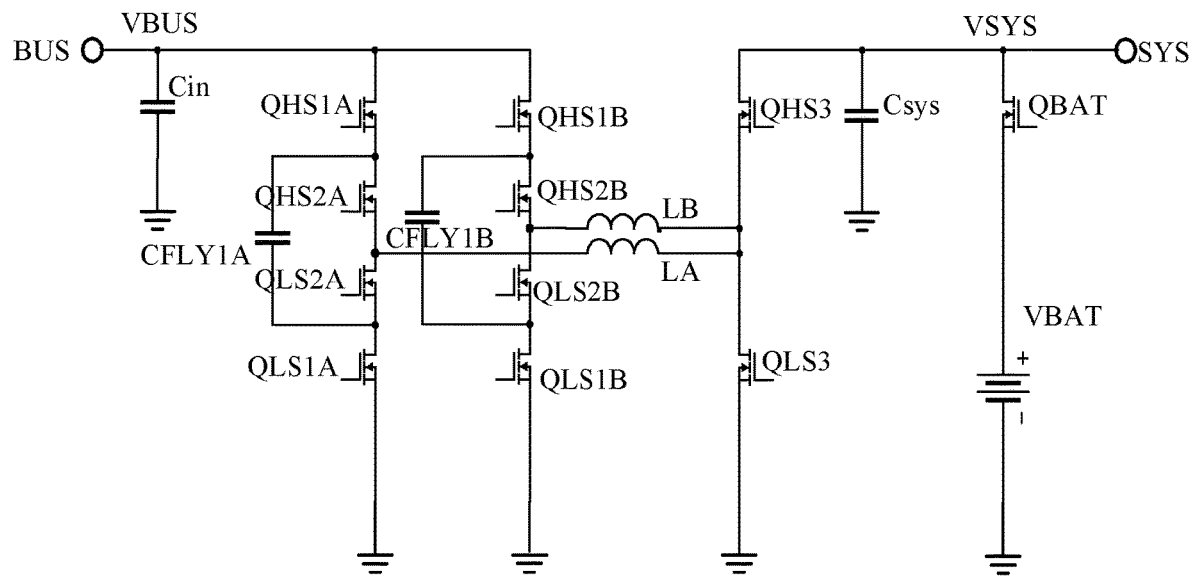
FIG. 12 is a schematic block diagram of a second example charging circuit, in accordance with embodiments of the present invention.

In addition, the first module may not be limited to a single-phase multi-level structure, and may further be a multi-phase multi-level structure to reduce the inductor current and input and output ripples, thus achieving a better efficiency and a higher power. Referring now to FIG. 12, shown is a schematic block diagram of a charging circuit according to a second embodiment of the present disclosure. In this particular example, the first module can include two parallel branches. A first branch can include power transistors QHS1A, QHS2A, QLS2A, and QLS1A that can connect in series between port BUS and the reference ground sequentially, and flying capacitor CFLY1A that can connect between a common node of power transistors QHS1A and QHS2A and a common node of power transistors QLS2A and QLS1A.

A second branch can include power transistors QHS1B, QHS2B, QLS2B, and QLS1B that can connect in series between port BUS and the reference ground sequentially, and flying capacitor CFLY1B that can connect between a common node of power transistors QHS1B and QHS2B and a common node of power transistors QLS2B and QLS1B. Additionally, an inductor LA can connect between a middle node of the first branch, that is, a common node of power transistors QHS2A and QLS2A, and the common node of power transistors QHS3 and QLS3 in the second module. An inductor LB can connect between a middle node of the second branch, that is, a common node of power transistors QHS2B and QLS2B, and the common node of power transistors QHS3 and QLS3 in the second module. Those skilled in the art will recognize that FIG. 12 only provides a two-phase structure. In other examples, it may have more phases. In some embodiments, the control of each of the phases may be the same as that described in the above examples. In other embodiments, a phase-shifting method may be adopted to control the phases, and the operating time sequences of each two phases have a phase difference.

Figure 13:
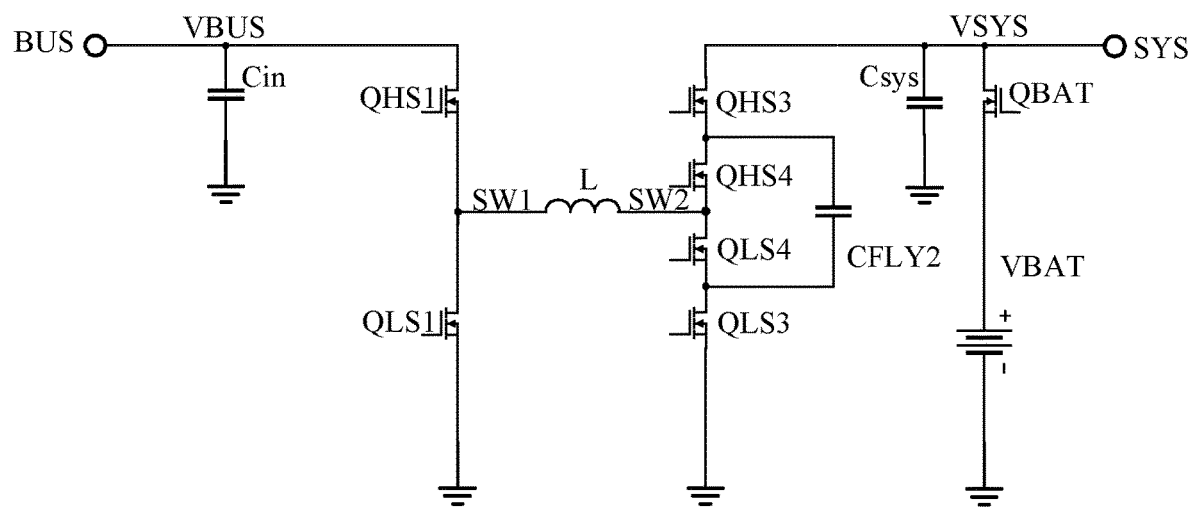
FIG. 13 is a schematic block diagram of a third example charging circuit, in accordance with embodiments of the present invention.
Figure 14:
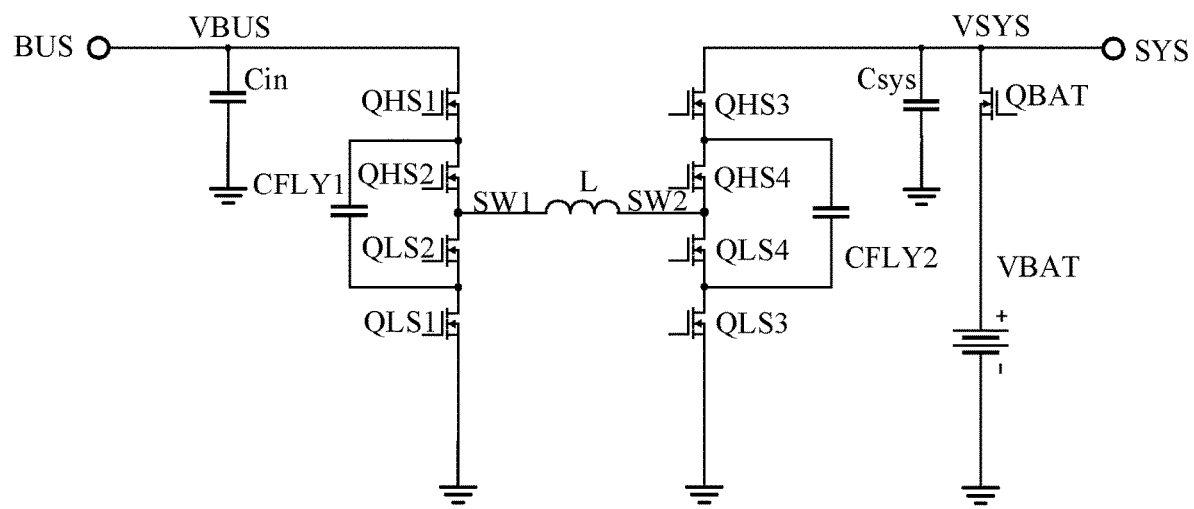
FIG. 14 is a schematic block diagram of a fourth example charging circuit, in accordance with embodiments of the present invention.

While the above disclosure takes the first module being a three-level structure as an example, in other examples, the second module may be configured as a three-level structure. Referring now to FIG. 13, when port BUS is an input port and port SYS is an output port, the first module and inductor L may form a buck converter, and the second module and inductor L may form a three-level boost converter, thus improving the efficiency of the second module. Of course, both the first module and the second module may have a three-level structure, as shown in FIG. 14. It should be understood that, while the three-level structure is taken as an example, the multi-level converter formed in particular embodiments can also be with more levels and with multiple phases. Those skilled in the art will recognize that the structure of the charging circuit can be configured depending on the conditions of particular input voltage and output voltage and application requirements, in order to achieve the optimal efficiency.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A charging circuit, comprising:
   a) a first module having a plurality of power transistors, and being coupled between a first port and a reference ground;
   b) a second module having a plurality of power transistors, and being coupled between a second port and the reference ground;
   c) at least one inductor coupled between the first module and the second module;
   d) wherein at least one of the first module and the second module forms a multi-level converter with the at least one inductor; and
   e) a control circuit configured to receive a plurality of control parameters and a plurality of reference signals respectively corresponding to the plurality of control parameters, in order to control a first of the plurality of control parameters to be equal to its corresponding reference signal, and to control a second of the plurality of control parameters to be either not greater than or not smaller than their corresponding reference signals.

2. The charging circuit of claim 1, wherein the charging circuit is configured to be controlled to respectively operate in a buck mode, a boost mode, or a buck-boost mode, according to a magnitude relationship between an input voltage and an output voltage.

3. The charging circuit of claim 2, wherein the power transistors of the charging circuit are controlled by the control circuit to be in different switching states, such that the charging circuit is smoothly switched among the buck mode, the boost mode, or the buck-boost mode.

4. The charging circuit of claim 1, wherein the first module and the inductor form a multi-level buck converter, the second module and the inductor form a boost converter, the first port receives an input voltage, and the second port generates an output voltage.

5. The charging circuit of claim 4, wherein:
   a) when a ratio of the input voltage to the output voltage is higher than a first threshold value, the charging circuit operates in a multi-level buck mode; when the ratio of the input voltage to the output voltage is lower than a second threshold value, the charging circuit operates in a boost mode; and
   b) when the ratio of the input voltage to the output voltage is between the first threshold value and the second threshold value, the charging circuit operates in a buck-boost mode.

6. The charging circuit of claim 5, wherein when the charging circuit operates in the multi-level buck mode, the power transistors of the first module are in a pulse-width modulation (PWM) switching state to be alternately turned on and off, and the power transistors of the second module are kept normally on or off.

7. The charging circuit of claim 5, wherein when the charging circuit operates in the boost mode, the power transistors of the first module are kept normally on or off, and the power transistors of the second module are in a PWM switching state to be alternately turned on and off.

8. The charging circuit of claim 5, wherein a switching frequency of the power transistors in a PWM switching state in a boost mode is N times a switching frequency of the power transistors in the PWM switching state in a multi-level buck mode, wherein N is a positive integer greater than or equal to 2 corresponding to a number of levels of the multi-level converter.

9. The charging circuit of claim 5, wherein when the charging circuit operates in the buck-boost mode, the power transistors of both the first module and the second module are in a PWM switching state to be alternately turned on and off.

10. The charging circuit of claim 5, wherein when the charging circuit operates in the buck-boost mode, part of the power transistors in the first module are kept normally on and the other power transistors in the first module are in a PWM switching state, such that the charging circuit is equivalent to a four-switch buck-boost converter.

11. The charging circuit of claim 1, wherein the first module comprises:
    a) a first power transistor, a second power transistor, a third power transistor, and a fourth power transistor coupled in series between the first port and the reference ground sequentially; and
    b) a flying capacitor coupled between a common node of the first power transistor and the second power transistor, and a common node of the third power transistor and the fourth power transistor.

12. The charging circuit of claim 11, wherein the second module comprises a fifth power transistor and a sixth power transistor coupled in series between the second port and the reference ground.

13. The charging circuit of claim 12, wherein the inductor is coupled between a common node of the second power transistor and the third power transistor, and a common node of the fifth power transistor and the sixth power transistor.

14. The charging circuit of claim 1, further comprising:
    a) a seventh power transistor;
    b) a battery coupled in series with the seventh power transistor between the second port and the reference ground; and
    c) wherein the seventh power transistor is controlled to operate in a complete conduction region, a linear region, or a cutoff region, according to a charging state of the battery to satisfy requirements of a charging current.

15. The charging circuit of claim 1, wherein the first module and the inductor form a multi-level boost converter, the second module and the inductor form a buck converter, the second port receives an input voltage, and the first port generates an output voltage.

16. The charging circuit of claim 1, wherein the formed multi-level converter comprises:
    a) a plurality of branches coupled in parallel;
    b) wherein each of the branches comprises a plurality of power transistors coupled in series between at least one of the first and second ports and the reference ground; and
    c) wherein each of the branches is coupled to another module through one inductor to form the multi-phase multi-level converter.

17. The charging circuit of claim 1, wherein the first module and the inductor form a buck converter, the second module and the inductor form a multi-level boost converter, the first port receives an input voltage, and the second port generates an output voltage.

18. The charging circuit of claim 1, wherein the first module and the inductor form a multi-level buck converter, the second module and the inductor form a multi-level boost converter, the first port receives an input voltage, and the second port generates an output voltage.

19. The charging circuit of claim 1, wherein the control circuit comprises:
   a) a plurality of error amplifiers respectively receiving the plurality of control parameters and the plurality of reference signals; and
   b) a selection circuit configured to receive output signals of each of the error amplifiers, and to select a smallest one among the output signals to be provided as a compensation signal.

20. The charging circuit of claim 19, wherein the control circuit further comprises:
   a) a first comparator configured to compare the compensation signal against a first ramp signal to generate drive signals for controlling the first power transistor and the fourth power transistor;
   b) a second comparator configured to compare the compensation signal against a second ramp signal to generate drive signals for controlling the second power transistor and the third power transistor; and
   c) a third comparator configured to compare the compensation signal against a third ramp signal to generate drive signals for controlling the fifth power transistor and the sixth power transistor.

* * * * *